United States Patent [19]

Meitzner et al.

[11] 4,297,220

[45] Oct. 27, 1981

[54] MACRORETICULATED COPOLYMER ADSORPTION PROCESS

[75] Inventors: Erich F. Meitzner, Glenside; James A. Oline, Wyncote, both of Pa.

[73] Assignee: Rohm and Haas Company, Philadelphia, Pa.

[21] Appl. No.: 152,941

[22] Filed: May 23, 1980

Related U.S. Application Data

[62] Division of Ser. No. 749,526, Jul. 18, 1958, Pat. No. 4,224,415.

[51] Int. Cl.³ ............................................. C02F 1/28
[52] U.S. Cl. .................................. 210/690; 210/692
[58] Field of Search ............ 210/690, 691, 692, 693, 210/694; 521/25, 29, 38, 52, 63, 64, 131, 132, 144, 146, 148, 149, 150; 536/25

[56] References Cited

U.S. PATENT DOCUMENTS

| | | | |
|---|---|---|---|
| 2,830,933 | 4/1958 | Bouchard | 536/25 |
| 2,974,178 | 3/1961 | Hwa | 210/690 |
| 2,996,430 | 8/1961 | Lightfoot | 536/25 |
| 3,275,548 | 9/1966 | Walters | 210/692 |
| 3,531,463 | 9/1970 | Gustafson | 210/692 |
| 3,549,562 | 12/1970 | Minclick | 521/32 |
| 3,637,535 | 1/1972 | Corte | 521/29 |

*Primary Examiner*—Ernest G. Therkorn
*Attorney, Agent, or Firm*—Louis F. Kline, Jr.

[57] ABSTRACT

Method for adsorbing an organic material from a fluid or fluid mixture containing organic material with a macroreticulated crosslinked copolymer having a plurality of microscopic channels resulting from the liquid explusion of a precipitating agent during polymerization of a monomer mixture under suspension polymerization conditions, whereby the organic material is adsorbed by the macroreticulated crosslinked copolymer.

3 Claims, 1 Drawing Figure

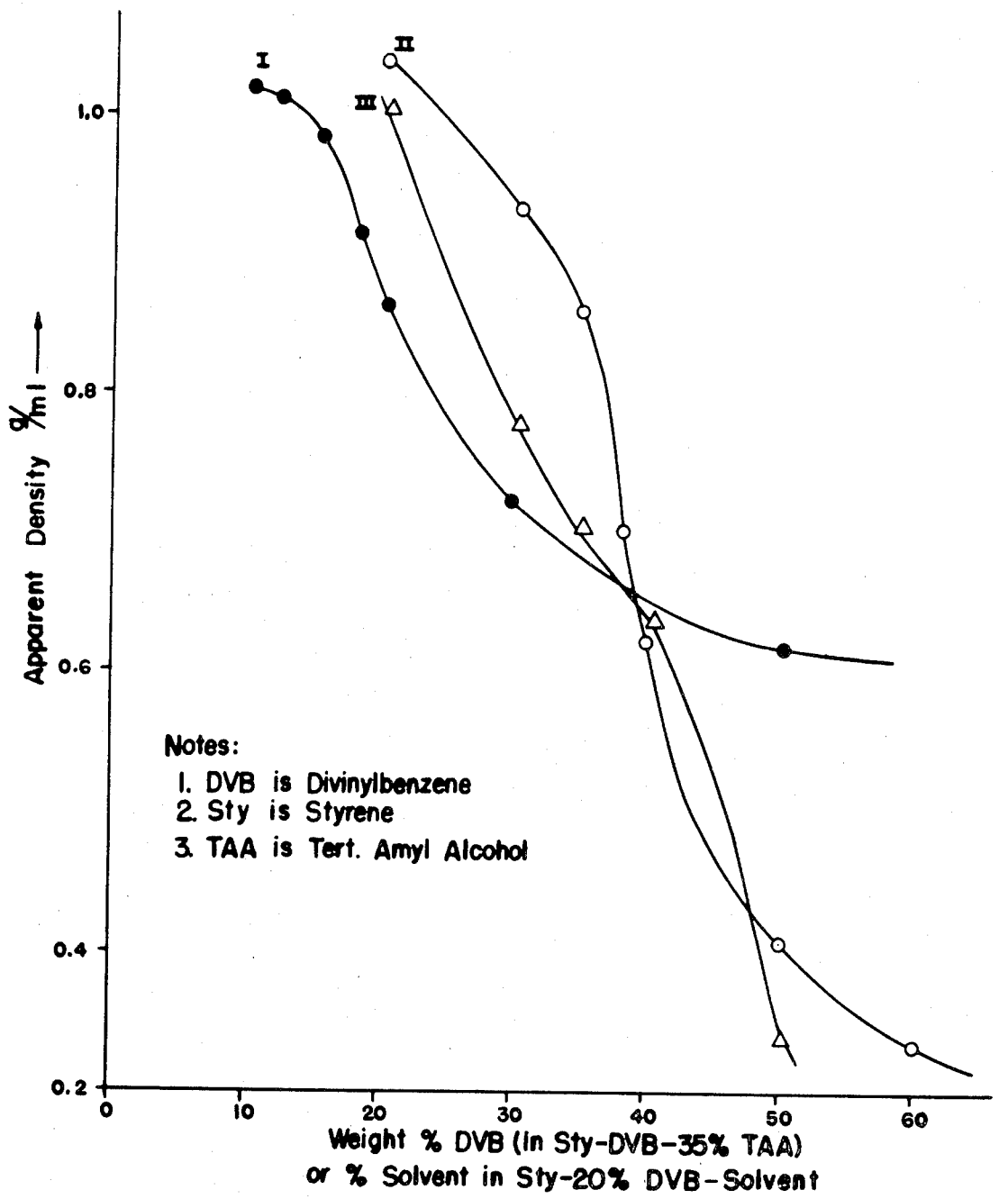

MACRORETICULATED COPOLYMER ADSORPTION PROCESS

This is a division of application Ser. No. 749,526 filed July 18, 1958 now U.S. Pat. No. 4,224,415.

This invention relates to a process for preparing copolymers and the copolymers prepared thereby.

An object of this invention is the use of copolymers which are valuable as absorbents for organic fluids. They are also valuable for the separation of mixtures of organic fluids.

The specification discloses the preparation of copolymers which are particularly suitable intermediates for the preparation of ion exchange resins.

The specification discloses the preparation of intermediates for the preparation of ion exchange resins which, while highly cross-linked, still exhibit desirable ion exchange characteristics, i.e., the ion exchange rates are high, the regeneration efficiency is good, etc.

The specification discloses the preparation of intermediates which are particularly suitable for the preparation of ion exchange resins that are highly resistant to oxidation.

The specification discloses the preparation of copolymers which exhibit a high specific surface, so that ion exchange resins prepared therefrom have much higher proportions of readily available exchange sites than resins heretofore available.

The specification discloses the preparation of cross-linked copolymers which are intermediates for the preparation of ion-exchange resins that have high moisture content even at high degrees of cross-linking.

The specification discloses the preparation of cross-linked copolymers which are intermediates for the preparation of ion-exchange resins which ion-exchange resins exhibit superior resistance to physical stresses, such as produced, for instance, by osmotic shock, than has heretofore been possible.

The specification discloses the preparation of cation exchangers of the sulfonic and carboxylic types as well as weak and strong base anion-exchange resins.

It is well known in the prior art to use cross-linked copolymers of monovinylidene and polyvinylidene monomers as intermediates for the production of ion-exchange resins. Conversion of such copolymers to cation-exchange resins by sulfonation is set forth in U.S. Pat. No. 2,366,007.

Although substantially insoluble sulfonated resins having high cation absorptive capacities and possessing good ion-exchange properties may be prepared by the method of U.S. Pat. No. 2,366,007, it is difficult by said method to obtain a high yield of the sulfonated resin in the form of stable granules of sizes and physical form well adapted to use in usual ion-exchange processes, e.g., for the softening or the purification of water. The difficulties which are encountered may be summarized as follows.

The copolymers of monovinyl- and polyvinylaromatic compounds, and also their sulfonation products, are hard, brittle resins which are susceptible to cracking, spalling, or shattering when subjected to internal strain or to large external stresses. For most ion exchange purposes, it is important that a major portion, e.g., 80 percent by weight or more, of the sulfonated resin be in the form of granules of from 10 to 60, preferably from 20 to 40, mesh size, since smaller particles tend to be washed from a bed of the resin during upflow of water through the bed and granules of larger sizes tend to develop excessive internal strains and to undergo shattering and spalling with formation of fine particles both during pre-conditioning for use in ion exchange processes and during use as an ion exchange agent in such processes.

As set forth in U.S. Pat. No. 2,500,149, the sulfonation process can be improved by swelling the copolymer in a solvent of specified properties prior to sulfonation. As this solvent must be imbibed readily by the copolymer, it must be chosen from the class capable of dissolving polystyrene, such as chlorinated aliphatic hydrocarbons. The preferred method consists of forming the copolymer in the absence of such solvent, thereafter allowing such solvent to be imbibed.

While the process as set forth in U.S. Pat. No. 2,500,149 does overcome many of the problems encountered in the sulfonation process, the cation exchange resin produced thereby still exhibits the general properties of the resins prepared by the process of U.S. Pat. No. 2,366,007, differing mainly in that the resin from the process of U.S. Pat. No. 2,500,149 contains a higher percentage of whole beads. The resins are just as susceptible to fracture on osmotic shock and still exhibit de-cross-linking on being subjected to oxidative conditions and volume changes when converted from one ionic form to another.

It has been claimed that many of these difficulties can be overcome by employing the process set forth in British Pat. No. 785,157. In the process disclosed in this patent, a monovinyl monomer is copolymerized with a polyvinyl monomer and the copolymer so prepared is then reacted further to produce the desired ion exchange resin. The improvement in the British Patent comprises partially pre-polymerizing the monovinyl monomer before adding the polyvinyl monomer. The same effects may be obtained by dissolving a preformed polymer in the monovinyl monomer before copolymerizing with the polyvinyl monomer. Ion exchange resins formed from these copolymer beads are said to be much more resistant to shock, and an anion exchanger prepared therefrom was superior on color removal. There is no evidence that the resins exhibit any higher resistance to oxidative de-cross-linking than any of the other prior art types. There would appear to be another disadvantage to the cation exchange products produced by the process of the British Patent. The copolymer contains linear polymer chains, i.e. chains which are not cross-linked. These chains on sulfonation become at least partially water-solubilized and so can be leached from the resin. Thus, there can be contamination of any fluid passing through the resin. Resins of this same general type are also described by Abrams (J. Ind. Eng. Chem. 48, 1469 et seq. (1956)).

In accordance with the present invention, unusual and completely unexpected properties have been surprisingly found in the copolymers which result when a monoethylenically unsaturated monomer and polyvinylidene monomers are suspension polymerized in in the presence of certain compounds. Characteristic of these compounds is the fact that each is a solvent for the monomer mixture being copolymerized and exerts essentially no solvent action on said copolymer. For ease of reference hereinafter, such a compound will be termed "polymer precipitant" or, even more simply, "precipitant".

The ion-exchange resins prepared using said copolymers as intermediates also exhibit unusual and unexpected properties.

It is necessary that precipitants form a homogeneous solution with the monomer. Further requirements are that the precipitants must be incapable of exerting solvent action on or being imbibed by the copolymer to any appreciable extent or the aforesaid unique properties will not be obtained in the copolymers produced. An additional requirement is that the precipitants must be chemically inert under the polymerization conditions. A preferred class of precipitants are those which are liquid under the polymerization conditions.

The determination of the most effective precipitant and the amounts required for the formation of a particular copolymer may vary from case to case because of the numerous factors involved. However, although there is no "universal" or single class of precipitants applicable to all cases it is not too difficult to determine which precipitants will be effective in a given situation. The requirements of solubility with the monomer mixture and low or non-solubility in the copolymer can be tested empirically and the solubilities of many monomers and copolymers are well known from publications and textbooks.

Cross-linked copolymers are generally insoluble, but they will absorb or imbibe liquids which might be considered as being good "solvents." By immersing the cross-linked copolymer in liquids and determining the degree of swelling, a suitable precipitant can be chosen. Any liquids which are solvents for the monomer mixture and which give negligible swelling of the copolymer will function as precipitants.

As a further guide in the selection of a suitable precipitant, reference may be made to scientific literature for instance as discussed in Hildebrand and Scott, *Solubility of Non-Electrolytes*. 3d ed., N.Y. 1950. In general, it may be stated that sufficiently wide differences in the solubility parameters of polymer and solvent, respectively, must exist for the precipitant to be effective; and that, once an effective precipitant has been located, the behavior of many other liquids may be predicted from the relative position of the reference polymer and precipitant in published tables, within the accuracy of such published information. Furthermore, if the solubility parameter of a given polymer occupies an intermediate position in these tables, solvents with both higher or lower parameters may become effective.

A minimum concentration of any particular precipitant is required to effect phase separation. This is comparable to the observation that many liquid systems containing two or more components are homogeneous when some components are present in only minor amounts; but if the critical concentration is exceeded, separation into more than one liquid phase will occur. The minimum concentration of the precipitant in the polymerizing mixture will have to be in excess of the critical concentration. The amounts in excess of such critical concentration can be varied and they will influence to some extent the properties of the product so formed.

Too high a concentration of the precipitant may be undesirable for practical reasons since the rate of copolymerization may decrease and the space-time yields become low. In many cases, the amount of precipitant employed may be between 25 percent and 60 percent of the total weight of the monomer mixture and the precipitant.

The effect of the concentration of the precipitant at a given cross-linker content and the effect of variations in the amount of cross-linker on the precipitant requirements is shown in Table I. In the case of tert-amyl alcohol and sec-butanol, the need for higher precipitant concentrations as the amount of cross-linking decreases is clearly evident. With all three alkanols, the values given show conclusively that there is a definite concentration of precipitant below which no phase separation occurs; and, without phase separation, the unusual and desirable properties of the products of this invention are not obtained.

TABLE I

EFFECT OF CONCENTRATION OF PRECIPITANT AND AMOUNT OF CROSS-LINKING OF A STYRENE DIVINYLBENZENE COPOLYMER

| DIVINYLBENZENE CONCENTRATION[1] | PRECIPITANT[4] | COPOLYMER APPEARANCE[2] |
|---|---|---|
| 20 | 20% TAA[3] | Clear |
| 20 | 35% TAA | P.S. |
| 16 | 25% TAA | Clear |
| 16 | 35% TAA | P.S. |
| 9 | 30% TAA | Clear |
| 9 | 40% TAA | P.S. |
| 20 | 25% sec-butanol | Clear |
| 20 | 30% sec-butanol | P.S. |
| 15 | 25% sec-butanol | Clear |
| 15 | 35% sec-butanol | P.S. |
| 6 | 35% sec-butanol | Clear |
| 6 | 40% sec-butanol | P.S. |
| 15 | 23% n-butanol | Clear |
| 15 | 35% n-butanol | P.S. |

NOTES:
[1] Divinylbenzene Concentration is the percent of divinylbenzene in the styrene-divinylbenzene copolymer based on the total weight of monomers.
[2] Copolymer appearance can be employed as a criterion of whether or not phase separation (P.S.) has occurred. If the beads are clear, there is no phase separation; when there is a small amount of phase separation, the beads are translucent, and as the amount of phase separation increases, the translucency increases. The examples of phase separation shown in this table represents substantially complete phase separation.
[3] TAA is tert-amyl alcohol.
[4] The percent precipitant is the percent based on the total weight of the organic phase, i.e. weight of monomers plus weight of precipitant.

While the use of a single precipitant facilitates recovery, purification and recycling of the precipitant, mixtures of precipitants are within the scope of the present invention.

When suspension copolymerizing monomers, and additional factor must be considered, namely the solubility of the precipitant in the suspending medium. Since suspension polymerization of most ethylenically unsaturated monomers is generally conducted in aqueous media, most frequently it is the water-solubility of the precipitant which must be considered. While precipitants with water-solubilities as high as 15 to 20 grams per 100 grams of water can be employed, a low water solubility is preferred because of handling ease, ease of recovery, and processing economies. As is well-known, however, it is possible to decrease the water-solubilities of compounds by adding salts to the aqueous phase. This method also may be employed to decrease the water-solubilities of the precipitants utilized so significantly in the present invention.

Introduction of the precipitant leads to two effects, the second effect undoubtedly depending on the first. By adding the precipitant to the monomer phase, the solubility in the monomer phase of any copolymer formed is decreased and the copolymer separates from the monomer phase as it is formed. This phenomenon is known as "phase separation". As the concentration of monomer in the polymerizing mass decreases due to polymerization, and as the concentration of resulting copolymer increases, the precipitant is more strongly repelled by the copolymer mass and is actually squeezed out of the copolymer phase leaving a series of microscopic channels.

These microscopic channels are separate and distinct from the micropores which are present in all cross-linked copolymers as is well-known to those skilled in the art (cf. Kunin, "Ion Exchange Resins", page 45 et seq., John Wiley & Sons, Inc., 1958). While said channels are relatively small in the commonly thought of sense, they are large when compared with the micropores hereinbefore referred to. Thus, as set forth hereinafter, the use of a precipitant results in the formation of an unusual and desirable structure. It is postulated that this "liquid expulsion" phenomenon and the resulting reticular structure is responsible for the unusual and unexpected properties of the resultant copolymer. Since the rigidity of the polymer mass at the time of precipitant expulsion is important, it is not surprising that the desirable properties obtained increase with increasing polyvinylidene content, i.e., increasing degrees of crosslinking. As a specific example, using a sulfonated styrene-divinylbenzene copolymer, the process of the present invention is appreciably less effective below about 4% to 6% divinylbenzene content in the copolymer than it is at higher divinylbenzene levels. With this specific system, preferred effects are obtained with a divinylbenzene content of from about 8% to about 25%, based on the weight of the monomer mixture.

Because of the reticular structure as hereinbefore set forth, these copolymers have enhanced utility in the field of adsorbents for fluids, ion exchange resins, and for applications in which lower density materials are desired. As hereinafter set forth, they can be subjected to chemical transformation, the resultant structures displaying similar advantages because of the reticular nature of the copolymers employed in the preparation of said structures. The terms "reticular" and "macroreticular", which are used interchangeably herein with the same intended meaning, relate to the unique structure of the polymers of the present invention produced by the herein disclosed phase separation technique utilizing a precipitating agent. Conventional prior art resins are essentially homogeneous cross-—linked "gels" wherein the only pore structure is defined by molecular-sized openings between polymer chains. This type of molecular porosity is presently known in the art as "microporosity". Macroreticular resins, by contrast, contain significant non-gel porosity in addition to the normal gel porosity. The non-gel pores have been seen, by electron micrographs, to be channels between agglomerates of minute spherical gel particles. The prior art gel resin has a continuous polymeric phase while the macroreticular resin is clearly shown to consist of agglomerates of randomly packed microspheres with both a continuous polymer phase and a continuous void phase. Thus the expression "porous" as used herein refers to the channels or openings between agglomerates of minute spherical particles.

The term "suspension polymerizing" is a term well-known to those skilled in the art and comprises suspending droplets of the monomer or monomer mixture in a medium in which the monomer or monomer mixture is substantially insoluble. This may be accomplished by adding the monomer or monomer mixture with any additives to the suspending medium which contains a dispersing or suspending agent, such as, for instance, in the case of an aqueous suspending medium, the ammonium salt of a styrene-maleic anhydride copolymer, carboxymethyl cellulose, bentonite or a magnesium silicate dispersion. When this medium is agitated, the monomer phase disperses into fine droplets, the size of the droplets depending on a number of factors, such as amount of dispersing agent, type and rate of agitation, etc. Agitation is continued until polymerization is complete. The polymerized droplets, generally termed "beads", are then separated from the suspending medium and further processed, if desired.

The suspension polymerization of ethylenically unsaturated monomers or monomer mixtures, particularly those employed in the process of the present invention, generally uses aqueous suspending media.

When employing water-soluble ethylenically unsaturated monomers, however, it is not possible to use aqueous suspending media unless the solubility of the monomers is such that they can be salted out. If it is not possible to salt out the monomers, then compounds in which the monomers are insoluble must be employed as suspending media. The compounds used must be chemically inert in the sense that they do not interfere with the polymerization reaction. Aliphatic hydrocarbons are typical of such media.

It is well-known that oxygen acts as an inhibitor of free radical polymerizations and should, therefore, be excluded. The preferred embodiments of this invention effect polymerization under substantially anaerobic conditions.

Suitable catalysts which provide free radicals which function as reaction initiators include benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide, etc.

The amount of peroxidic catalyst required is roughly proportional to the concentration of the mixture of monomers. The usual range is 0.01% to 3% of catalyst with reference to the weight of the monomer mixture. The preferred range is from 0.2% to 1.5%. The optimum amount of catalyst is determined in large part by the nature of the particular monomers selected, including the nature of the impurities which may accompany said monomers.

Another suitable class of free radical generating compounds are the azo catalysts. There may be used, for example, azodiisobutyronitrile, azodiisobutyramide, azobis($\alpha,\alpha$-dimethylvaleronitrile), azobis($\alpha$-methylbutyronitrile), dimethyl, diethyl, or dibutyl azobis(-methylvalerate). These and other similar azo compounds serve as free radical initiators. They contain an —N=N— group attached to aliphatic carbon atoms, at least one of which is tertiary. An amount of 0.01% to 2% of the weight of monomer or monomers is usually sufficient.

Another method of effecting copolymerization of the compositions of the present invention is by subjecting the reaction mixture to ultraviolet light in the presence of suitable catalysts at ambient or slightly elevated temperatures. Such catalysts include benzoin, azoisobutyronitrile, etc.

Suitable monoethylenically unsaturated monomers, including monovinylidene monomers, include the following: methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, and the corresponding esters of methacrylic acid, styrene, vinyltoluene, vinylnaphthalene, and similar unsaturated monomers.

In the case of the acrylic esters, a preferred embodiment employs lower aliphatic esters of acrylic acid in which the aliphatic group contains from one to five carbon atoms. This is a particularly preferred embodiment when the copolymers therefrom are to be employed as intermediates in the preparation of either carboxylic cation exchange resins or anion exchange resins. In the preparation of both the carboxylic exchanger and the anion exchanger, the ester group is replaced. Thus, the practical choice is methyl or ethyl acrylate.

Another class of suitable monovinylidene monomers include the monovinylidene ring-containing nitrogen heterocyclic compounds, such as vinylpyridine, 2-methyl-5-vinylpyridine, 2-ethyl-5-vinylpyridine, 3-methyl-5-vinylpyridine, 2,3-dimethyl-5-vinylpyridine, and 2-methyl-3-ethyl-5-vinylpyridine, 2-methyl-5-vinylquinoline, 4-methyl-4-vinylquinoline, 1-methyl- or 3-methyl-5-vinylisoquinoline and vinylpyrrolidone.

Copolymers of the above monomers with monovinylene compounds, such as dialkyl maleates, dialkyl fumarates, dialkyl crotonates, dialkyl itaconates, and dialkyl glutaconates, are also possible.

Suitable polyvinylidene compounds include the following: divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, polyvinyl or polyallyl ethers of glycol, of glycerol, of pentaerythritol, of mono-, or dithio- derivatives of glycols, and of resorcinol; divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylenediacrylamide, N,N'-methylene dimethacrylamide, N,N'-ethylenediacrylamide, 1,2-di($\alpha$-methyl-methylene sulfonamido)ethylene, trivinylbenzene, trivinylnaphthalene, and polyvinylanthracenes.

Particularly preferred polyvinylidene monomers, commonly known as "cross-linkers", include the following: polyvinylaromatic hydrocarbons, such as divinylbenzene and trivinylbenzene, glycol dimethacrylates, such as ethylene glycol dimethacrylate, and polyvinyl ethers of polyhydric alcohols, such as divinoxyethane and trivinoxypropane.

The ratio of the monovinylidene monomers to the polyvinylidene monomers may be varied widely within the scope of the present invention, depending on the use for which the copolymer is intended. As is well-known in the art, the polyvinylidene monomers function as cross-linking agents by bridging two linear polymer chains. The ratio of the polyvinylidene to monovinylidene monomers is an indication of the amount of cross-linking present in the copolymer. It is important to control accurately the ratio of polyvinylidene monomers to monovinylidene monomers, since the degree of cross-linking has a profound effect on the physical properties of the product. The effects of the degree of cross-linking show up strikingly when ion exchange resins are prepared from the copolymers. If a monovinylaromatic hydrocarbon is used as the monovinylidene monomer, and a divinylaromatic hydrocarbon, such as divinylbenzene, is used as the polyvinylidene monomer, a cross-linked polystyrene is formed on copolymerization. This copolymer can be sulfonated either with sulfuric acid, oleum, sulfur trioxide, or chlorosulfonic acid to form a cation exchanger or it may be chloromethylated and aminated to form an anion exchanger.

The degree of cross-linking of the copolymer controls to a large extent the properties of the ion exchange resins produced therefrom, whether they be cation or anion exchangers. If the degree of cross-linking be too high, then the ion exchange resins therefrom will have too slow an exchange rate and too low a moisture content. If the degree of cross-linking of the copolymer be too low, then the resins produced will be deficient in oxidation resistance and will fail prematurely in service. Furthermore, a resin with a low degree of cross-linking also exhibits excessive swelling when converted from one ionic form to another and also exhibits lower ion selectivity than resins with higher degrees of cross-linking. Thus, under prior art conditions, it was necessary to restrict the amount of cross-linking comonomer used in order to obtain a satisfactory rate of ion adsorption. This invariably meant compromising on oxidation resistance and, hence, the stability of the resin in service. Means have long been sought which would make possible the employment of high ratios of cross-linking agent to obtain the desired stability without being penalized with regard to the rate of ion adsorption and other ion-exchange properties as hereinbefore set forth.

It has now been found possible to achieve excellent resistance to oxidation by employing a high ratio of cross-linking monomer while retaining the desired ion-exchange properties. This can be effected if a mixture of a polyvinylidene monomer and monoethylenically unsaturated monomer is suspension copolymerized in the presence of a precipitant in accordance with the present invention. As set forth herein, the amount of cross-linking monomer employed in the reaction mixture also affects the ratio of the precipitant which must be employed to get the desired effect. Furthermore, the ratio will vary with the chemical identity of the cross-linker. The cross-linked copolymers produced by the process of this invention are particularly suitable as intermediates for use in the preparation of ion-exchange resins, both anion and cation types, whether of the character having homofunctional or mixed-functional groups.

The process of the present invention is particularly applicable in the suspension copolymerization of ethylenically unsaturated monomers, since suspension copolymerization, when conducted under the conditions as hereinafter set forth, produces spherical beads, the size of which can be controllably varied over wide ranges. Such beads are particularly suitable as intermediates for the preparation of ion exchange resins. As aforesaid, such resins may be of the anion and cation types.

As set forth hereinbefore, the chemical character of the precipitant may vary appreciably depending on the monomer mixture which is used. When employing aromatic hydrocarbon type monomers, such as, for instance, styrene and divinylbenzene, alkanols with a carbon atom content of from about 4 to about 10 will effect the desired phase separation and the accompanying liquid expulsion when used in amounts of from about 30% to about 50% of the total weight of monomers and precipitant.

Higher saturated aliphatic hydrocarbons, such as heptane, isooctane, and the like may be employed as precipitants for aromatic hydrocarbon systems, such as styrene and divinylbenzene. The amounts employed can be varied from about 30% to about 50% of the total weight of the monomers and precipitant.

When employing acrylic esters as said monovinylidene monomers, alkyl esters can be effectively employed as precipitants. Typical esters include n-hexyl acetate, 2-ethylhexyl acetate, methyl oleate, dibutyl sebacate, dibutyl adipate and dibutyl carbonate. The esters must have a carbon atom content of at least 7. The concentrations required will vary somewhat with the ester being used but from about 30% to about 50% on the combined weight of the monomers and the precipitant will effectively cause the desired phase separation and the formation of a reticular structure within the polymerized mass.

Saturated higher aliphatic hydrocarbons, such as heptane, isooctane, and the like may be employed as precipitants when employing acrylic esters as the monovinylidene monomers. The amounts employed can be varied from about 25% to about 50%.

When employing ring-containing nitrogen heterocyclic compounds, such as vinylpyridine and substituted vinylpyridines, as the monovinylidene monomers, higher saturated aliphatic hydrocarbons are suitable as precipitants. Typical examples are heptane, isooctane, and the like, and they can be employed in amounts varying from about 15% to about 45%.

The copolymers of the present invention are valuable as absorbents for organic fluids because of their very high specific surface. Indicative of their reticular structure is the rate of absorption of fluids. A 20% divinylbenzene-styrene resin prepared by the process of the present invention was immersed in benzene and reached equilibrium within one minute. In contrast, a 9% divinylbenzene-styrene resin, prepared by prior art process, required sixteen hours to reach equilibrium, this in spite of its very much lower divinylbenzene content.

Preferential absorption of fluids by copolymers can be determined by immersing the copolymer in a mixture of fluids and determining the composition of the external phase at any given time after immersion. A mixture of benzene and heptane, containing 48.6% benzene, was prepared. A sample of a 20% divinylbenzene-styrene copolymer prepared by the process of the present invention was immersed in the benzene-heptane mixture. After two minutes immersion, the composition of the liquid phase was determined. It was 44.4% benzene, showing preferential absorption of benzene by the copolymer. Under the same conditions, the 9% divinylbenzene copolymer prepared by a prior art process showed no absorption of organic fluid and thus no change in the composition of the liquid phase.

A preferred embodiment of this invention employs a monovinyl aromatic hydrocarbon as the monovinylidene monomer, a polyvinyl aromatic hydrocarbon as the polyvinylidene monomer, and an alkanol with a carbon content of $C_4$ to $C_{10}$ as the precipitant. Thus, styrene may be used as the monovinylidene monomer, divinylbenzene or trivinylbenzene as the polyvinylidene monomer, and tert-amyl alcohol as the alkanol. Normal butanol, sec-butanol, 2-ethylhexanol, and decanol also function well as precipitants. The quantities of alkanol required are from about 30% to about 50% of the weight of the monomer mixture and the alkanol with the least amount of precipitant being required at the highest percentage of cross-linking. The mixture of the three compounds is free radical aqueous suspension copolymerized in the presence of a suspending agent and under controlled agitation to produce copolymer beads with a diameter ranging from about 0.35 to about 1.2 mm. The beads are washed with water, dried, and then subjected to sulfonation using concentrated sulfuric acid, oleum, sulfur trioxide or chlorosulfonic acid as sulfonating agent. The resulting cation exchange resin is washed with water until substantially free from water solubles. As stated hereinbefore, the effects of the process of the present invention are most marked when a higher level of cross-linking agent is employed, and with the styrene-divinylbenzene system, a level of 8% to 25% of divinylbenzene, based on the total weight of monomer mix, gives the preferred results.

A comparison of the exchange resins prepared by using precipitants in accordance with the present invention with resins of exactly the same composition except for the omission of such precipitants shows clearly the unexpected and improved properties obtained by the novel process of the present invention. As specific examples, styrene-divinylbenzene beads containing 20% divinylbenzene were prepared by the two processes, i.e., a "standard" suspension polymerization reaction without alkanol and by the methods of the present invention employing tert-amyl alcohol. The "standard" copolymer beads had a density in water of 1.047 whearas the beads prepared by the liquid expulsion process had a density in water of 0.866. The measurement of the true densities of both beads showed no essential difference in the values. Comparison of the apparent densities of the two copolymers showed essentially no voids or microscopic channels in the "standard" and approximately 17.5% voids in the beads prepared by the liquid expulsion process.

Low apparent densities, indicative of the presence of the microscopic channels hereinbefore described, are characteristic of the copolymers prepared according to the present invention. The densities decrease as the amount of cross-linking increases and also decrease as the amount of precipitant increases. Both of these effects are clearly demonstrated by the data in Table II. Similar results are presented graphically in the FIGURE.

The apparent densities, as listed in the specification, were determined by pycnometric methods, using specially designed pycnometers and water containing 1 ppm of a non-ionic wetting agent as the contacting fluid. The reproducibility of the test method was demonstrated by repeated measurement.

It is assumed that the contacting fluid fills the voids between the bead particles but not the microscopic channels within the bead particles themselves. This is supported by the observation that the beads remain afloat indefinitely. In solvents which swell the polymer particles, however, such as ethylene dichloride, the channels within the bead particles are filled by the contacting fluid or such channels may be closed so that density values of the order of the standard type bead are obtained.

TABLE II

Densities of Styrene-Divinylbenzene L.E.[1] Resins

| Percent DVB[2] | Precipitant | Percent Solvent | Density of Beads in Water |
|---|---|---|---|
| 20 | — | — | 1.047 ± .001 |
| 10 | TAA[3] | 35 | 1.020 ± .000 |
| 12 | TAA | 35 | 1.017 ± .001 |
| 15 | TAA | 35 | 0.984 ± .000 |
| 18 | TAA | 35 | 0.917 ± .001 |
| 30 | TAA | 35 | 0.730 ± .002 |
| 50 | TAA | 35 | 0.620 ± .002 |
| 20 | TAA | 20 | 1.042 ± .003 |
| 20 | TAA | 30 | .936 ± .005 |
| 20 | TAA | 35 | .866 ± .003 |
| 20 | TAA | 38 | .704 ± .005 |
| 20 | TAA | 40 | .626 ± .004 |
| 20 | TAA | 50 | .411 ± .000 |
| 20 | TAA | 60 | .34 ± .02 |
| 20 | Iso-octane | 20 | 1.016 ± .002 |
| 20 | Iso-octane | 30 | .781 ± .007 |
| 20 | Iso-octane | 40 | .642 ± .000 |
| 20 | Iso-octane | 50 | .338 ± .000 |
| 20 | 2-ethylhexanol | 40 | .734 ± .001 |
| 20 | BuOH-2 | 40 | .501 ± .001 |

NOTE:
[1]L.E. resins are resins prepared using the liquid expulsion technique of the present invention.
[2]DVB is divinylbenzene.
[3]TAA is tert-amyl alcohol.

When converted to a sulfonic acid type cation-exchange resin as hereinbefore described, the 20 percent divinylbenzene copolymer prepared using a precipitant exhibits a completely unexpected and valuable combination of properties. The resin is remarkably resistant to physical stresses, such as the stresses caused by osmotic shock. The resin can be dried and dropped into water with substantially no physical breakdown. The moisture content, exchange rate, and regeneration efficiency of the aforementioned 20 percent divinylbenzene resin when equilibrated with water is equivalent to that of a "standard" resin, prepared without precipitant, containing only 9 percent divinylbenzene.

When anion-exchange resins are prepared from copolymers prepared by the method of the present invention, it is found that they exhibit excellent color removal properties, even at relatively high cross-linker content. They also do not change volume appreciably on conversion from one ionic form to another. Anion-exchange resins prepared from copolymers prepared without precipitant are deficient in color removal properties, and their decolorizing capacity decreases rapidly as the cross-linker content increases. In order to obtain sufficient decolorizing capacity to make the resins useful, it is necessary to use low levels of cross-linkers; and these resins change volume excessively on conversion from one ionic form to another. These excessive volume changes result in physical breakdown of the resins in use.

Methods of preparing anion-exchange resins from copolymers are set forth in U.S. Pat. No. 2,591,573, and these methods can be employed with copolymers of the present invention. They comprise chloralkylating a styrene-divinylbenzene copolymer and subsequently aminating the chloralkylated copolymer.

A wide variety of amines can be employed in the amination reaction. Thus, primary, secondary, and tertiary alkylamines or arylamines can be employed. Polyalkylenepolyamines can also be used successfully. Typical polyalkylenepolyamines include ethylenediamine, diethylenetriamine, triethylenetetramine, tetraethylenepentamine, propylenediamine, and the like. Aminoalcohols such as dimethylaminoethanol can also be used successfully.

A preferred embodiment of this patent employs a trialkylamine as the aminating agent, thus producing quaternary anion exchangers. The alkyl radical does not generally contain more than 4 carbon atoms, with trimethylamine being the preferred amine.

Another preferred embodiment of this invention employs copolymerization of styrene as the monovinylidene monomer, divinylbenzene as the polyvinylidene monomer, and an alkanol with 4 to 10 carbon atoms as the precipitant. Chlormethylation of the resulting copolymer is effected with chlormethyl ether and trimethylamine is employed as the aminating agent. A preferred range of divinylbenzene contents is from about 4 percent to about 15 percent.

A styrene-divinylbenzene copolymer containing 20 percent divinylbenzene and prepared according to the process of the present invention was nitrated with nitric acid and the resulting nitrated polyer was reduced to the corresponding amino polymer by treatment with a tin-hydrochloric acid mixture, such a reduction procedure being well known to those skilled in the art. The aminopolymer exhibited weak base anion-exchange properties.

Another preferred embodiment of the present invention employs alkyl or alkoxy acrylates as the monovinylidene monomers, a polyvinylaromatic hydrocarbon as the polyvinylidene monomer, and an alkyl ester with a carbon atom content of greater than 7 as precipitant. Thus, methyl acrylate may be used as the monovinylidene monomer, divinylbenzene or trivinylbenzene as the polyvinylidene monomer and 2-ethylhexyl acetate as the precipitant. At 10 percent divinylbenzene content (based on the total weight of the polymerizable monomers present) and at 30 percent of 2-ethylhexyl acetate (based on the total weight of the organic phase), free radical aqueous suspension polymerization produced white beads which were characterized by resistance to physical breakdown on further chemical processing. Hydrolysis produced a carboxylic cation exchanger with substantially no decrease in bead integrity. Similar retention of physicals is noted on aminolysis of the copolymer to produce anion exchangers.

The amines which can be employed in the aminolysis reaction must contain at least two amino groups, at least one of which is a primary amino group. The primary amino groups react with the ester groups in the cross-linked copolymer to form amido groups. These amido groups, however, do not in themselves have anion-adsorbing properties. The groups which do adsorb anions are the other amino groups which are present in the amino compound. These groups can be primary, secondary, or tertiary. Very satisfactory amino compounds include the following: Propylenediamine; imino bis-propylamine of the formula

hydroxyethyldiethylenetriamine of the formula

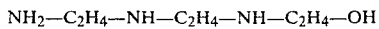

N-aminopropylmorpholine, N-aminoethylmorpholine, and dimethylaminopropylamine which are particularly valuable because the resins made from these compounds are easily converted to strongly basic quaternary ammonium anion-exchange resins; diethylenetriamine; triethylenetetramine; tetraethylenepentamine; and the like.

A preferred range of divinylbenzene contents when employed in the system in which acrylic esters are used as the monovinylidene monomers is from about 5 percent to about 25 percent.

When similar resin compositions are prepared in the absence of a precipitant, the products of hydrolysis or aminolysis are usually extensively cracked and fragmented. Furthermore, the process of cracking and fragmentation of the resin particles continues in use, resulting, eventually, in complete physical disintegration of the resin to a useless powder.

Another embodiment of the present invention employs a vinylpyridene as the monovinylidene monomer, a polyvinylaromatic hydrocarbon as the polyvinylidene monomer and a saturated higher aliphatic hydrocarbon as the copolymer precipitant. Thus, 2-methyl-5-vinylpyridine was suspension copolymerized with divinylbenzene, using iso-octane as the copolymer precipitant. The resulting copolymer exhibited anion-exchange properties, but was too weak a base to be of practical utility. The copolymer was quaternized by reacting it with an alkyl halide such as methyl chloride, methyl iodide, or dimethyl sulfate. This quaternized copolymer was a strongly basic anion exchanger. When employing an alkylsubstituted vinylpryridine as the monovinylidene monomer and divinylbenzene as the polyvinylidene monomer, preferred ranges of divinylbenzene content are from 5 percent to 25 percent, based on the total weight of the monomers.

An outstanding characteristic of the ion-exchange resins prepared from copolymers prepared by the process of the present invention is the increased resistance to oxidative degradation. This is an extremely important property in an ion-exchange resin, since it is one of the key properties which control the stability or "life" of the resin in service. An accelerated test has been devised to determine the oxidation resistance of cation-exchange resins of the sulfonic acid type produced by the sulfonation of copolymers of styrene and divinylbenzene at varying divinylbenzene levels; it comprises contacting the copper form of the resin with aqueous sodium hypochlorite solution and determining the salt-splitting cation capacity after each contact. (For method of determining salt-splitting cation capacity, see Kunin, Ion Exchange Resins [John Wiley & Sons, 1958], p. 342 et seq.)

The details of this oxidation resistance test are as follows: A one-gram sample of the sodium form of the resin, previously screened to a −20 to +25 mesh size, was converted to the hydrogen form by treatment with an excess of 4 percent hydrochloric acid, rinsed with deionized water and its salt-splitting cation capacity determined. After rinsing again with deionized water, it was converted to the copper form by treatment with an excess of 4 percent copper sulfate solution. It was rinsed with deionized water and contacted with 200 ml. of 5.25 percent sodium hypochlorite solution at 30° C. for 16 hours. It was again rinsed with deionized water, converted to the hydrogen form by treatment with an excess of 4 percent hydrochloric acid, rinsed, and its salt-splitting cation capacity determined. The cycle can be repeated until the loss of capacity is so great that the resin is rendered useless.

Destruction of the resin by oxidation is shown by a loss in salt-splitting cation capacity. The results of this accelerated oxidation resistance test as applied to a number of resin samples are shown in Table III.

TABLE III

| Percent Divinylbenzene | Percent Loss of S.S.C.C.[2] of Original Sample After Contacts | | |
|---|---|---|---|
| | 1 | 2 | 3 |
| 9, L.E. type[1] | 3.7 | 12.7 | 22.3 |
| 9, L.E. type | 5.0 | 8.7 | 13.1 |
| 12, L.E. type | 4.2 | 11.6 | 20.2 |
| 20, L.E. type | 1.0 | 4.1 | 5.2 |
| 20, L.E. type | 1.1 | 4.0 | 5.3 |
| 9, Std. type[3] | 33 | 79 | 82 |
| 10.5, Std. type | 26.4 | 71.9 | 83.7 |
| 12.5, Std. type | 13.6 | 50.9 | 83.3 |

NOTES:
[1]L.E. type is cation exchanger prepared from copolymer prepared with precipitant by the process of the present invention.
[2]S.S.C.C. is salt-splitting cation capacity.
[3]Standard type is cation exchanger prepared from copolymer prepared without precipitant.

Another indication of the physical strength of ion-exchange resins is their physical stability when subjected to alternate wetting and drying cycles. Such cycles subject the resin particles to severe stresses due to the appreciable swelling which occurs on wetting and the comparable shrinkage which occurs on drying. Many resins will break down into useless fine particles on one such cycle. A test was devised to determine the amount of fines generated by such cycles on different resin samples. The details of the test are as follows:

The screened resin samples to be tested were placed in aluminum foil weighing pans around the outside of a turntable. A single pin hole was punched in each pan to connect it with a paper wick to drain water from the pan. The pans were spaced evenly around the top shelf of the automatic turntable with a small beaker on the second shelf under each pan to catch the water that drained out. An infrared lamp was positioned over one side of the turntable and an intermittent dispenser was positioned to deliver water one-third of a cycle beyond the drying lamp. This dispenser was timed to deliver 10 ml. of water every time a sample pan passed under it. This water slowly drained through the pin hole during the next one-third cycle. By the time the sample again arrived under the infrared lamp, it had drained and was ready for drying. The entire cycle for each sample required approximately two hours, a time cycle which permitted approximately ten minutes drying time per sample. This time is known to reduce the residual moisture content of sulfonic resins to less than 10 percent.

Two grams wet samples of sodium-form resin of known moisture content were weighed into the aluminum dishes. In all cases, the sample had been pre-screened to give a definite screen cut. Samples were added and removed from the cycles in the portion of the cycle just after the addition of water. The samples were re-screened every third cycle. The material passing the smaller of the original two screens was collected and its dry weight determind in each case. The material still in the original particle size range can be returned to the pans for additional cycling, if desired. The dry weight of the fines was determined and expressed as a percentage of the original dry weight of the sample.

The results of a series of such tests are shown in Table IV.

TABLE IV

| Percent DVB[1] | Mesh Cut | Percent Fines Developed[4] |
|---|---|---|
| 9, Std. type[2] | −20 to +30 | 51.8 |

TABLE IV-continued

| Percent DVB[1] | Mesh Cut | Percent Fines Developed[4] |
|---|---|---|
| | −30 to +40 | 14.3 |
| 12.5, Std. type | −20 to +30 | 63.0 |
| | −30 to +40 | 22.8 |
| 15, L.E. type[3] | −20 to +30 | 2.0 |
| 20, L.E. type | −20 to +30 | 3.7 |
| | −30 to +40 | 1.4 |

NOTES:
[1]DVB is divinylbenzene
[2]Standard (Std.) type is sulfonic type cation exchanger prepared from copolymer prepared without precipitant.
[3]L.E. type is sulfonic type cation exchanger prepared from copolymer prepared with precipitant by the process of the present invention.
hu 4Figures given represent the percentage fines developed after three (3) cycles. Minor variations in the low figures are not considered to be significant. A value below five (5) is considered to be excellent.

One undesirable characteristic of carboxylic cation exchangers derived from cross-linked acrylic ester copolymers by hydrolyzing said copolymers is the poor resistance to physical shock which they exhibit. On changing from one ionic form to another, they exhibit appreciable change in particle size which changes set up stresses within the resin particle. With some resins, the particle breakdown may occur during the processing required to produce the final product. In other cases, the breakdown occurs during use. In both cases, the net result is a finely divided powder, useless for its intended purpose.

An accelerated test was developed to determine the relative resistace to shock of the various resins which comprised contacting a screened moist resin sample in 1 N sodium hydroxide, rinsing with dionized water and then contacting with 1 N hydrochloric acid and then rinsing with deionized water. The cycle was repeated every four minutes. At any predetermined time, the samples were re-screened and the portion of the sample which passed through the smaller of the two original screens was collected and weighed. Typical carboxylic cation exchangers prepared by the hydrolysis of methyl acrylate-divinylbenzene copolymers prepared without precipitant were subjected to the acid-base cycling test hereinbefore described. Using a −20 to +30 mesh cut and cycling 15 times, a loss of 33 percent was observed. A methyl acrylate-divinylbenzene copolymer of the same composition as the one described hereinbefore, but prepared with a precipitant in accordance with the process of the present invention was hydrolyzed to the corresponding carboxylic cation exchanger and subjected to the same cycling test. The loss due to physical breakdown was negligible, being 0.55 percent. The results of these tests clearly show the marked superiority of the carboxylic cation exchangers prepared from the copolymers of the present invention.

The following examples set forth certain well-defined instances of the application of this invention. They are not, however, to be considered as limitations thereof, since many modifications may be made without departing from the spirit and scope of this invention.

Unless otherwise specified, all parts are parts by weight.

EXAMPLE I

A mixture of styrene (121.6 g.), technical divinylbenzene (38.4 g. containing 50 percent active ingredient), 87 g. of tert. amyl alcohol and 1 g. of benzoyl peroxide was charged to a solution of 6.5 g. of sodium chloride and 0.5 g. of the ammonium salt of a commercial styrene maleic anhydride copolymer in 174 g. of water. The mixture was agitated until the organic components were dispersed as fine droplets and then heated to 86°–88° C. for 6 hours.

The resultant polymer pearls were filtered and washed with water and freed from excess water and amyl alcohol by drying at elevated temperature. The product was obtained in the form of white opaque spherical or spheroidal particles amounting to 145 g. When the dried product was dropped into a fluid such as hexane, fine bubbles were seen to rise from the immersed particles due to displacement of air held within the void spaces of the resin by the organic fluid.

EXAMPLE II

A mixture of styrene (360 g.), technical divinylbenzene (240 g. of 50 percent divinylbenzene concentration), benzoyl peroxide (3.8 g.) and secondary butanol (400 g.) was charged to a solution of 27 g. of sodium chloride and 3 g. of the ammonium salt of a commercial styrene-maleic anhydride copolymer in 722 g. of water. Agitation was applied so that the organic phase was dispersed in the form of fine droplets. The polymerization was carried out by heating at 86°–92° C. for six hours. Steam was then passed through the reaction mixture and an azeotropic mixture of secondary butanol and water was removed overhead. The beads so formed were then filtered and washed with water and then dried for five hours at 125° C. There was obtained 543 g. of white opaque polymer in the form of spherical or spheroidal particles.

The bulking volume of this material was compared with the analogous product prepared in the absence of secondary butanol. Weighed quantities of each resin were transferred to graduated cylinders and the products settled by tapping. The material prepared in the presence of butanol had a bulking volume of 2.9 ml./g. whereas a product of the same composition but prepared without butanol had a bulking volume of only 1.55 ml./g.

EXAMPLE III

Sulfuric acid (99 percent, 750 g.) and the dried product (75 g.) prepared as set forth in Example I were charged to a flask and heated with stirring at 118° to 122° C. for 6 hours. The mixture was then cooled to about 20° C. and diluted with water. The solid product was filtered and washing was continued to remove all soluble material.

The drained product, amounting to 301 g. of water swollen sulfonated product in the hydrogen form, was of translucent to opaque appearance and consisted nearly entirely of uncracked whole spherical particles in contrast to the heavy shattering and spalling encountered with polymer particles prepared in the absence of the conditions provided by the invention. The product was converted to the sodium form by the use of a small excess of sodium hydroxide.

The sodium form of the resin had a moisture content of 51 percent, a salt splitting capacity of 4.6 meq./g. dry or 1.8 meq./ml. in the wet condition. The density was 49 lbs./cu. ft.

The polymeric product prepared as set forth in Example II was sulfonated in an analogous manner. It had an exchange capacity of 4.6 meq./g. dry or 2.0 meq./ml. wet, a moisture content of 46 percent and a density of 52 lbs./cu. ft., all values referring to the sodium form of the resin.

EXAMPLE IV (A) A mixture of styrene (88 g.), trivinylbenzene (12 g.), benzoyl peroxide (1 g.) and tert-amyl alcohol (54 g.) was dispersed in a solution of 7 g. of sodium chloride and 0.6 of the ammonium salt of a commercial styrene-maleic anhydride copolymer in 185 g. of water. The polymerization was carried out by heating at 86°–90° C. for 5 hours. The beads so formed were filtered, washed with water and then dried 5 hours at 125° C. There was obtained a yield of 99 g. of white opaque polymer in the form of spherical or spheroidal particles.

(B) The dried product (70 g.) prepared as set forth in part A and sulfuric acid (99 percent, 800 g.) was heated with stirring at 118°–122° C. for 7 hours. The mixture was then cooled to about 35° C. and diluted with water. The solid product was filtered, washed well with water to remove water soluble products, and drained. There remained 273 g. of water-swollen sulfonated product in the hydrogen form. The product was substantially completely in the form of uncracked whole spherical particles of translucent to opaque appearance.

EXAMPLE V (A) A mixture of styrene (100 g.), technical divinylbenzene (43 g. of 50 percent concentration), benzoyl peroxide (0.9 g.) and secondary butanol (48 g.) was charged to a solution of 7 g. of sodium chloride and 0.6 g. of the ammonium salt of a commercial styrene-maleic anhydride copolymer in 212 g. of water. Agitation was applied so that the organic phase was dispersed in the form of fine droplets. The polymerization was carried out by heating at 86°–90° C. for 5 hours. The beads so formed were filtered, washed with water, and then dried for 5 hours at 125° C. There was obtained 136 g. of clear, colorless polymer in the form of spherical or spheriodal particles.

(B) In a similar preparation, a mixture of styrene (100 g.), technical divinylbenzene (43 g. of 50 percent concentration), benzoyl peroxide (0.9 g.) and secondary butanol (62 g.) was charged to a solution of 7 g. of sodium chloride and 0.6 g. of the ammonium salt of a commercial styrene-maleic anhydride copolymer in 212 g. of water. Agitation as applied and the polymerization was carried out by heating at 86°–90° C. for 5 hours. The beads so formed were filtered, washed with water and then dried 5 hours at 125° C. There was obtained 135 g. of white opaque polymer in the form of spherical or spheroidal particles.

(C) The polymeric beads as prepared as set forth in A and B above were sulfonated as described in Example VB.

The product of part "A" shattered extensively during the sulfonation reaction as well as in the subsequent step of diluting the sulfuric acid, whereas the product of part "B" consisted substantially wholly of perfect uncracked spherical particles.

EXAMPLE VI

A copolymer of styrene and 10 percent divinylbenzene prepared in the presence of 40 percent butanol-2 as described in earlier examples was freed of butanol and water by steam distillation and oven drying at 125° C. for 6 hours. One hundred and six parts by weight of such resin was added to a mixture of 160 parts of ethylene dichloride and 200 parts of methyl chloromethyl ether. The mixture was held at 35°–40° C. and 66.7 parts of aluminum chloride was added in portions during a period of two hours. Agitation was maintained at the same temperature range for a period of sixteen hours. Cold water was then added to decompose excess chloromethyl ether and aluminum chloride and the reaction product was subjected to repeated washing with water, followed by draining of excess liquid. The chloromethylated product, obtained as a light yellow, granular product swollen with ethylene dichloride, amounted to 145 parts on a dry basis and contained 18.5 percent of organically bound chlorine.

The aforesaid washed intermediate was stirred with 190 parts (by weight) of a 25 percent aqueous solution of trimethyl amine. The temperature was held at 20° to 30° C. for two hours. The mixture was then heated to boiling and a mixture of residual ethylene dichloride and water was removed. Water was replaced as needed and the distillation was continued until no more ethylene dichloride appeared in the distillate. The reaction product was washed and filtered. There remained 510 parts of yellowish, opaque, granular material having an anion exchange capacity of 3.7 meq./g. (dry basis) or 0.9 meq./ml. wet basis. Its capacity to decolorize a crude sugar solution exceeded that of a commerical ion-exchange resin technically employed for this purpose by 500–100 percent. The volume increase upon conversion from the chloride to the hydroxyl form was found to be only 11.4% whereas the commercial resin showed swelling values of 25–40 percent.

EXAMPLE VII

A solution of 2.00 grams of lauroyl peroxide in a mixture of 114.7 g. of methyl acrylate (containing 0.02 percent p-methoxyphenol inhibitor), 25.3 g. of commercial divinylbenzene (containing 55.4 percent of actual divinylbenzene) and 60.0 g. of 2-ethylhexyl acetate was suspended by agitation in 300 g. of an aqueous solution containing, besides water, 5.0 g. of the ammonium salt of a styrene/maleic anhydride copolymer. The whole mixture was protected from air by maintaining an atmosphere of nitrogen within the reaction vessel. The mixture was heated to 65° C. and held at this temperature for three hours, during which time copolymerization of the methyl acrylate and divinylbenzene took place, the droplets of liquid being converted to spherical particles of resin, still containing much of the 2-ethylhexyl acetate. The mixture was heated to 90° C. and held at that temperature for one hour, then cooled. Liquid was drained from the resin and the resin particles were washed with water to remove residues of dispersing agent and minor amounts of emulsion polymer. By returning the resin to the reaction flask, adding water, boiling and collecting the condensed vapors, amounts up to 85 percent of the 2-ethylhexyl acetate charged was recovered. The resin was filtered from the liquid and dried at 125° C. for five hours to remove water and residual 2-ethylhexyl acetate. The yield of dry resin was 124 g.

An outstanding difference between the product of the preparation just described and one prepared in the same way but omitting the 2-ethylhexyl acetate was in the physical appearance of the beads. The preparation made without 2-ethylhexyl acetate consisted of clear, transparent colorless resin beads. The preparation made with the acetate ester present consisted of whitish beads ranging from transparent, but very hazy, to translucent in appearance.

EXAMPLE VIII

A mixture of ethyl acrylate (114 grams), technical divinylbenzene (26 grams of 55 percent concentration), 2-ethylhexyl acetate (60 grams) and lauroyl peroxide (2.0 grams) was added to an agitated solution of the ammonium salt of a styrene/maleic anhydride copolymer (0.4 gram) in water (298 cc.). The vessel was flushed with nitrogen and a slow stream of nitrogen maintained throughout the reaction. The batch was heated to 65° C. for two hours and 90° C. for one hour. The opaque spherical bead product was then transferred to a column and steam passed through the column downflow until the 2-ethylhexyl acetate was removed from the polymer. The product was dried at elevated temperature, and 133 grams of translucent material was obtained.

One hundred parts of this product was mixed with three hundred parts of diethylenetriamine in a flask equipped with a short fractionating column. The batch temperature was gradually raised to 190° to 205° C. and maintained at this level for four hours. A fraction rich in ethyl alcohol was collected in the receiver during this period. The resin was isolated by dilution with water, filtration and washing to remove soluble material. The product (303 parts moist, 119 parts on a dry basis) consisted of opaque spherical particles with an anion exchange capacity of 8.54 meq./gram dry.

EXAMPLE IX

A monomer solution was prepared by mixing 115 grams of methyl acrylate, 25 grams of divinylbenzene (55.4 percent assay), 60 grams of di-n-butyl sebacate and 2 grams of lauroyl peroxide. This solution was added gradually with stirring to 300 ml. of water containing 2 grams of the ammonium salt of a styrene/maleic anhydride copolymer. The mixture was heated at 65° C. for 3 hours and at 90° C. for one hour. The polymer was obtained in bead form by filtration and was then heated at 125° for five hours.

One hundred grams of this resin was heated to reflux with aqueous sodium hydroxide (650 grams, 10 percent concentration) for 8 hours. During this time, the polymeric ester and sebacate remaining in the beads were hydrolyzed. The resin was filtered and washed to remove soluble materials.

The resin was converted from the sodium to the hydrogen form by treatment with a small excess of 5 percent aqueous hydrochloric acid. The yield was 168 grams of a white opaque material of perfect bead form having a solids content of 41.5 percent and a cation-exchange capacity of 9.7 meq./gram.

A sample of this resin was placed in an automatic cycling device in which the sample was exposed to 1 N sodium hydroxide, water, 1 N hydrochloric acid and water in a 4-minute over-all cycle with aspirated drainage of each reagent in turn. In a twenty-four hour test period only 0.2 percent fines were generated by this osmotic shock treatment. Comparable resins prepared in the absence of dibutyl sebacate tended to form cracked and broken beads during the hydrolysis step and disintegrated to the extent of 20 percent or more in the cycling test during the twenty-four hour test period.

EXAMPLE X

The chlormethylated cross-linked styrene copolymer prepared as set forth in Example VI was drained to remove excess ethylene dichloride and water. This product (332 grams, containing 57 percent of volatile material) was added to a flask containing 500 ml. of toluene equipped with reflux condenser and agitator. Dimethylamine (41 grams) was gradually added to the mixture at room temperature while stirring. After 20 hours, water was added and a downward condenser was attached to the apparatus. The mixture was heated and distillation was continued until the organic solvents had been removed. The resin particles were isolated by filtration. In order to place the resin in the fully regenerated form, it was stirred with dilute sodium hydroxide for one hour and freed from excess caustic by washing. The yield of moist product was 332 grams or 145 grams on a dry basis.

EXAMPLE XI

A methyl acrylate/divinylbenzene copolymer was prepared by suspension polymerization in the presence of 30 percent 2-ethylhexyl acetate and the product was freed from the acetate ester by steam distillation or by extraction with a solvent such as methanol. The polymer was then dried at elevated temperature. The resin (100 grams) was charged to a pressure vessel containing 400 grams of 3-dimethylaminopropylamine-1. The closed vessel was heated at 170° C. for 5 hours, then cooled to room temperature. Water was added slowly, the product was filtered and washed thoroughly to remove excess amine. The yield of moist product was 348 grams having a solids content of 37 percent and an anion-exchange capacity of 4.74 meq./gram (dry basis).

EXAMPLE XII

The chlormethylated intermediate prepared as set forth in Example VI was stirred with 225 ml. of water and 36 grams of dimethylaminoethanol. The mixture was heated to 74° C. for 2 hours and ethylene dichloride was removed by azeotropic distillation with water. There remained 231 grams of opaque yellow solid having a moisture content of 60 percent and a nitrogen content of 4 percent.

EXAMPLE XIII

A styrene copolymer with a nominal divinylbenzene content of 20 percent, prepared in the presence of 35 percent tert-amyl alcohol, was dried at elevated temperature to remove volatile material. The resin (92.5 grams) was mixed with technical sulfuric acid (398 grams, 98 percent) and concentrated nitric acid (380 grams, 70 percent) was added dropwise during a period of 2 hours. Heat was evolved and the temperature was maintained at 45° to 50° C. The temperature was then gradually increased to 80° to 83° C. and held at this level for 4 hours. After cooling, the resin was filtered and washed repeatedly with water to remove soluble acidic material. The product (138 grams) was dried at elevated temperature. Nitrogen, found 9.7 percent; calc. for mononitration 9.1 percent.

The nitropolymer was evaluated in solvent swelling tests in comparison with nitrated styrene polymers containing as little as 1 percent divinylbenzene cross-linking agent. The former material possessed a rate of solvent uptake several times that of the standard glassy type polymer.

Example XIV

| Solution A | |
|---|---|
| 2-Methyl-5-vinylpyridine | 98 grams |
| Divinylbenzene, technical (55%) | 37 grams |

Example XIV-continued

| | |
|---|---|
| Iso-octane | 45 grams |
| Azo-bis-isobutyronitrile | 1.35 grams |
| Solution B | |
| Water | 183 grams |
| Sodium chloride (25% solution) | 44 grams |
| Ammonium salt of styrene/maleic anhydride copolymer (20% aqueous solution) | 5 grams |

Solution "A" was added gradually with agitation to solution "B", the rate of agitation being adjusted so as to form droplets of the desired size. The temperature was raised to 76° to 80° and the vigorous reaction was moderated by cooling as needed. After five hours, the product was isolated by filtration and washed repeatedly. Volatile material was removed by drying, beginning at 65° C. and completing the drying step at 120° to 125° C. for 5 hours.

The product was obtained in the form of white opaque spherical particles having an anion-exchange cpacity of 4.3 meq./gram dry.

The above formulation was based on a nominal divinylbenzene content of 15 percent divinylbenzene and the iso-octane content in solution "A" was 25 percent. In other preparations, the divinylbenzene content was varied from 5 percent to 25 percent and the iso-octane content from 15 percent to 35 percent with similar results. Because of the more highly developed polar character of the pyridine type polymer, relatively small quantities of the non-polar paraffinic solvent will suffice to induce phase separation.

Strong base resins of the quaternary type were obtained by treatment of the vinylpyridine polymers with alkylating agents, such as methyl chloride, ethyl bromide, dimethyl sulfate, etc.

EXAMPLE XV

A mixture of styrene (120 grams), ethylene dimethacrylate (30 grams), tert-amyl alcohol (100 grams) and benzoyl peroxide (1 gram) was added to a solution of sodium chloride (5.4 grams) and 0.6 grams of carboxymethyl cellulose in water (190 grams). The mixture was agitated and heated at 88° C. for 5 hours. The product was filtered, washed with water and dried in an oven at 105° C.

The white opaque spherical product (140 grams) was added to a mixture of ethylene dichloride (565 grams) and methyl chloromethyl ether (200 grams). Aluminum chloride (90 grams) was added in portions during a 2-hour period with stirring while maintaining a temperature of 30°–40° C. After 10 more hours at the same temperature, cold water was added. The waste liquors were drained and several water washes applied.

The chloromethylated intermediate was obtained as light yellow spherical particles, moist with water and swollen with ethylene dichloride and containing 20.7 percent of chloride on a dry basis.

Conversion to anion-exchange resins was accomplished in a similar fashion as described in Examples VI, X, and XII.

EXAMPLE XVI

Methoxyethyl acrylate (116 grams, containing 0.05 percent 1-methoxy-4-hydroxybenzene inhibitor), technical divinylbenzene (24 grams, 58.2 percent assay), iso-octane (86 grams) and lauroyl peroxide (2.0 grams) were mixed and gradually added to an agitated solution of polyvinyl alcohol (0.5 grams) in water (290 grams). A slow stream of nitrogen was passed through the vessel while the mixture was heated from 67°–88° C. for 3 hours. The originally clear droplets became turbid as polymerization progressed and white opaque beads were formed. The product was filtered, washed and dried in an oven at elevated temperature. The yield was 137 grams.

EXAMPLE XVII

A mixture of N-vinylpyrrolidone (40 parts) and ethylene dichloride (10 parts) and azoisobutyronitrile (0.5 parts) was prepared. Portions of this solution were mixed in a ratio of 7:3 with an alcohol or ester taken from the following group: secondary, tertiary and iso-amyl alcohol, secondary butyl alcohol and 2-ethylhexyl alcohol and the acetate esters of the following alcohols, isooctyl, nonyl and 2-ethylhexyl. The samples, including a control without additive, were polymerized by exposure to 65° C. for one hour. The control was clear whereas the other samples showed evidence of phase separation.

EXAMPLE XVIII

The nitrated styrene/divinylbenzene copolymer prepared according to Example XIII was stirred with concentrated hydrochloric acid (540 ml.). Granulated tin (20 mesh; 240 grams) was added during the course of 2 hours. The temperature rose spontaneously to 78° C. The mixture was then heated externally to 85°–95° C. for 24 hours. After removal of the acid the polymeric product was washed several times with water and then four times with aqueous sodium hydroxide (5 percent), or until the effluent was clear. After further washing with water, there remained 250 grams of dark colored resin having a moisture content of 50 percent and an anion exchange capacity of 2.5 meq./gram (dry basis).

We claim:

1. Method for adsorbing an organic material from a fluid or fluid mixture containing the same which comprises contacting the fluid or fluid mixture containing organic material with a macroreticulated crosslinked copolymer having a plurality of microscopic channels resulting from liquid explusion of a precipitating agent during polymerization of a monomer mixture under suspension polymerization conditions in an aqueous media of (1) a polyvinylidene monomer containing a plurality of ethylenically unsaturated groups in a non-conjugated relationship and (2) at least one monoethylenically unsaturated monomer, said copolymerization taking place in the pressure of a liquid which is a solvent for the monomer mixture and which does not swell the copolymer resulting from said copolymerization, said liquid being present in an amount sufficient to cause separation of the copolymer from the monomer phase, whereby the organic material is adsorbed by the macroreticulated crosslinked copolymer.

2. The method of claim 1 wherein the fluid or fluid mixture contains at least one aromatic organic material.

3. The method of claim 1 wherein the macroreticulated crosslinked copolymer adsorbent has a high specific surface and a void volume of at least 18%.

* * * * *

UNITED STATES PATENT AND TRADEMARK OFFICE
CERTIFICATE OF CORRECTION

PATENT NO. : 4,297,220

DATED : October 27, 1981

INVENTOR(S) : Erich F. Meitzner and James A. Oline

It is certified that error appears in the above—identified patent and that said Letters Patent is hereby corrected as shown below:

Col. 4, line 45, "and" should be --an--.
Col. 10, line 33, "wheareas" should be --whereas--.
Col. 12, line 20, "polyer" should be --polymer--.
Col. 14, line 58, "determind" should be --determined--.
Col. 15, line 13, "hu" (before Footnote 4) should be deleted.
Col. 15, line 29, "resistace" should be --resistance--.
Col. 15, line 31, "dionized" should be --deionized--.
Col. 18, line 26, "500" should be --50--.
Col. 21, line 22, "cpacity" should be --capacity--.
Col. 22, line 54, "pressure" should be --presence--.

Signed and Sealed this

Fourth Day of October 1983

[SEAL]

Attest:

GERALD J. MOSSINGHOFF

Attesting Officer

Commissioner of Patents and Trademarks